Jan. 1, 1935. H. F. SMITH 1,985,906

SOLDER WIPER

Filed June 23, 1933

INVENTOR
Harold F. Smith
BY
ATTORNEYS

Patented Jan. 1, 1935

1,985,906

UNITED STATES PATENT OFFICE 1,985,906

SOLDER WIPER

Harold F. Smith, Fairport, N. Y., assignor to American Can Company, New York, N. Y., a corporation of New Jersey Application June 23, 1933, Serial No. 677,339

9 Claims. (Cl. 113—97)

The present invention relates broadly to can body side seam soldering machines or the like, and has more particular reference to attachments associated with the wiper section of such machines whereby solder thrown off from the wiper is prevented from entering into the can bodies.

The invention is particularly concerned with shielding the open ends of the can bodies as they move toward and past the solder wiper, thus protecting the interior of the bodies from solder pellets or other foreign matter which may be thrown off of the wiper during its wiping operation.

The principal object, therefore, of the present invention is the provision of a device for association with a solder wiper in a soldering machine which blocks off an open end of the can body and catches the solder and other foreign matter thrown from the wiper and prevents their passage into the can.

Numerous other objects and advantages of the invention will be apparent as it is better understood from the following description, which taken in connection with the accompanying drawing, discloses a preferred embodiment thereof.

Referring to the drawing.

Figure 1:
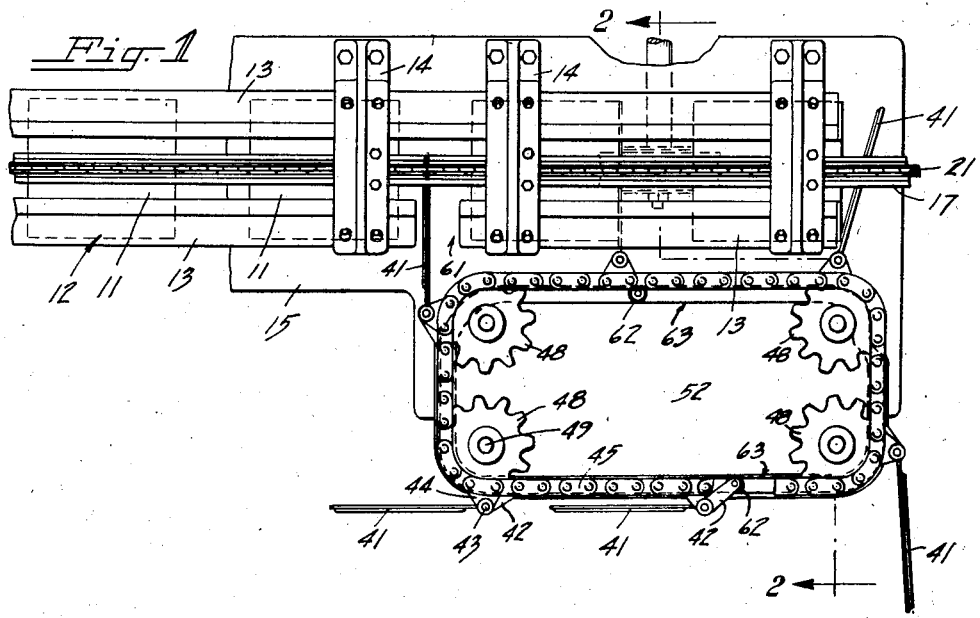
Figure 1 is a plan view of a device embodying the present invention, parts of which have been broken away.

Fig. 1 illustrates can bodies 11 as passing along and as being supported within a horizontal solder horn 12 which comprises four hollow bars 13 tied together by spaced brackets 14 supported on a frame 15. The frame 15 may be an extension of the frame of the soldering machine and the horn may be an extension of the soldering horn which supports the bodies during the soldering operation.

A U-shaped channel 17 (Fig. 2) is positioned longitudinally of and intermediate the two upper horn bars 13 and is secured to the brackets 14 by bolts 18. This channel 17 supports and guides one run of a can body conveying chain 21 which carries spaced lugs 22 and these lugs project in between and engage the can bodies in the usual manner. The chain 21 is preferably the same as the chain of the conveyor system of the soldering machine.

Figure 2:
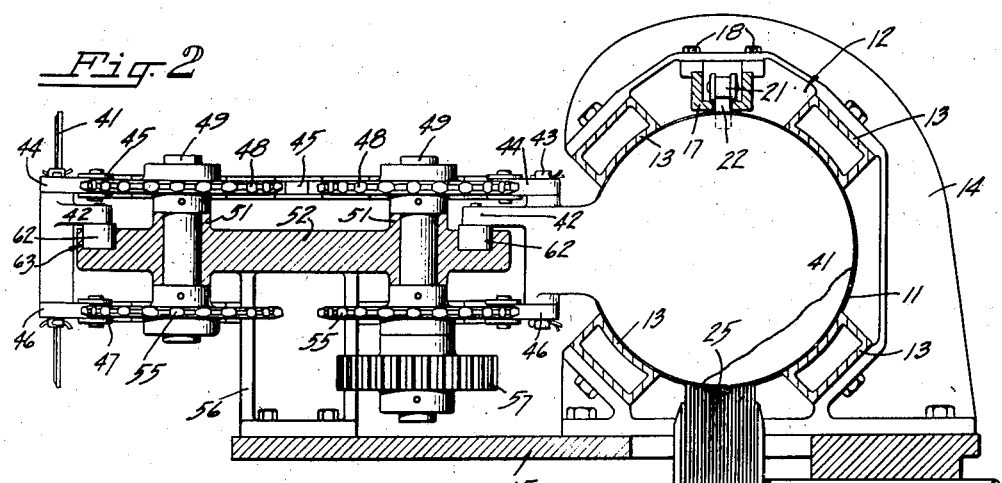
Fig. 2 is an enlarged vertical transverse sectional view taken substantially along the broken line 2—2 in Fig. 1 and turned through 90° to show its natural position.

During the soldering operation which forms no part of this invention, a quantity of solder is deposited on the can body in the usual manner along a side seam 25 (Fig. 2). The bodies 11 passing into the horn 12 are in position with their side seams at the bottom of the horn and intermediate the two lower bars 13.

The can body is propelled along the horn 12 in the direction towards the right of Fig. 1 by the chain 21 past a wiping station where the seam is wiped in the usual manner. The wiping operation is performed by a circular wiper 31 of cloth or other suitable discs held together by side disc plates 32, the wiper being mounted on one end of a shaft 33 journaled in a bearing 34 formed in the frame 15. This shaft is continually rotated in any suitable manner and in a direction opposite to the direction of can travel.

The wiper 31 tends to throw off portions of semi-molten solder which fly off tangentially in various positions and this is aggravated when the wiper becomes "loaded" with solder. In the usual soldering and wiping machines of this class small pellets 36 (Fig. 3) of this solder are thrown inside of the can bodies passing along the horn 12 and approaching the wiping position, and besides being a waste of soldering energy the pieces of solder which stick to the inside can wall are very undesirable.

Figure 3:
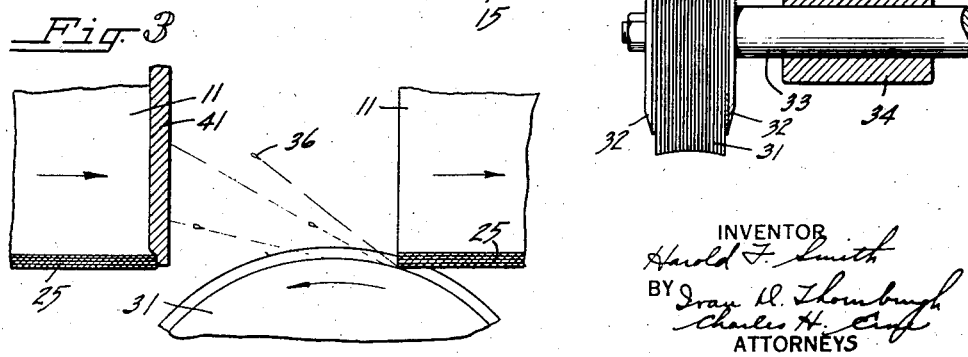
Fig. 3 is a schematic view, showing the prevention of the entrance of solder thrown off by the wiper into the can body.

In the present invention this is prevented by a plate or shutter 41 (Figs. 1, 2 and 3) which is inserted between and in front of the can bodies adjacent the wiping station and is held in position to shield the entire forward open end of the body as it approaches and passes over the wiper. There are a series of these plates 41 moving in synchronism with the travel of the container bodies along the horn 12. Fig. 3 illustrates how such a plate protects the interior of the body during its passage to and over the wiper, the plate acting as a target or shield for the solder pellets which strike against the forward surface of the moving plate instead of passing into the can body.

Each plate 41 is formed integrally with a lever extension 42 which is pivoted at 43 to a link 44 of a horizontal upper chain 45 and to a link 46 of a horizontal lower chain 47. The chain 45 passes over a series of sprockets 48, four being shown in the drawing. Each sprocket is mounted on the upper end of a short shaft 49 journaled in a bearing 51 formed in a rectangular horizontal table 52.

The lower chain 47 passes over four sprockets 55 mounted on the lower ends of the shafts 49. The sprockets 48, 55 and their shafts 49 are placed in the four corners of the table 52 and each chain 45, 47 in passing over the sprockets follow the path of travel of a rectangle with rounded corners, one side of which is parallel to the horn 12 adjacent the wiping station. The table 52 is secured to the frame 15 by connecting leg brackets 56 (Fig. 2).

One of the shafts 49 is longer than the others (Fig. 2) and carries on its bottom end a gear 57 through which this shaft and the chains and sprocket system is operated. This system of sprockets and chains moves in synchronism with the can body conveyor chain 21 and inserts a protecting plate 41 in front of each body 11 as it approaches and passes over the wiper 31.

The correct positioning of each protecting plate 41 requires other acting forces than the mere movement of the chains. Each plate also passes into the supporting solder horn 12 at one position (Fig. 1) and for this purpose the two inside horn bars 13 are cut away at 61 to afford such entrance.

Each plate as it enters through the opening is held at right angles to the horn and to the chain section adjacent and its position is further controlled relative to its pivotal connection on the links 44, 46 of the chains 45, 47. A description of this control follows.

Each lever 42 carries a cam roller 62 which moves within and follows a cam groove 63 (Figs. 1 and 2) cut into the top of the table 52. As the chains 45, 47 carry the plates 41 around their rectangular course of travel the groove 63 acting on the cam rollers and levers successively projects the plates at right angles through the opening 61 and into the horn 12, and then holds them at right angles to the straight side of the chains passing adjacent the horn. This holds the plates in front of the can bodies and covers the open ends completely, the shape and dimension of the plate corresponding to the shape and dimension of the cross section of a can body.

After a plate passes to the front inner corner of the track the action of the cam groove 63 swings the associated lever 42 on its pivots 43 and quickly sweeps the plate away from the can body and thence brings it in position parallel with the chains as they move away from the horn and around the return straight sections of the rectangle as best shown in Fig. 1.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A solder wiping device for soldering machines, comprising in combination, means for supporting open end can bodies having soldered side seams, a wiper located adjacent said supporting means for wiping said soldered side seams, conveyor means for propelling said can bodies along said support and past said wiper, and means for shielding an open end of a said passing can body against the entrance of foreign matter into its interior.

2. A solder wiping device for soldering machines, comprising in combination, means for supporting open end can bodies having soldered side seams, a wiper located adjacent said supporting means for wiping said soldered side seams, conveyor means for propelling said can bodies along said support and past said wiper, and means for interposing an obstruction between the open ends of passing can bodies and said wiper to prevent the entrance into said bodies of foreign matter thrown off by said wiper.

3. A solder wiping device for soldering machines, comprising in combination, means for supporting open end can bodies having soldered side seams, a wiper located adjacent said supporting means for wiping said soldered side seams, conveyor means for propelling said can bodies along said support and past said wiper, shields for preventing the entrance of foreign matter into the interior of said can bodies, and means for placing a said shield between adjacent can bodies as they are being propelled along said supporting means to block the path of projection of solder pellets thrown off by said wiper.

4. A solder wiping device for soldering machines, comprising in combination, means for supporting open end can bodies having soldered side seams, a rotatable wiper located adjacent said supporting means for wiping the excess solder from said side seams, conveyor means for propelling said can bodies along said support and past said rotating wiper, and means for closing an open end of each passing can body as it approaches said wiper, said closing means catching excess solder thrown off by said rotating wiper and preventing its entrance into said moving can body.

5. A solder wiping device for soldering machines, comprising in combination, means for supporting open end can bodies having soldered side seams, a wiper located adjacent said supporting means for wiping said side seams, conveyor means for propelling said can bodies along said support and past said wiper, a shutter for closing the open end of each of said can bodies against the entrance of foreign matter into their interiors while they are being conveyed past said wiper, and means for positioning said shutter in the open end of said can bodies.

6. A solder wiping device for soldering machines, comprising in combination, means for supporting open end can bodies having soldered side seams, a wiper adjacent said supporting means for wiping the excess solder from said seams, conveyor means for propelling said can bodies along said support and past said wiper, shutters for closing the open end of said can bodies against the entrance of foreign matter into their interiors while they are being conveyed past said wiper, and means for carrying said shutters in synchronism with the movement of said can bodies along said support to hold them in said open end closing position.

7. A solder wiping device for soldering machines, comprising in combination, means for supporting open end can bodies having soldered side seams, means located adjacent said supporting means for wiping the excess solder from said seams, conveyor means for propelling said can bodies along said support and past said seam wiping means, a plurality of shutters for closing the open ends of said can bodies against the entrance of solder into their interiors while they are being conveyed past said seam wiping means, and means for controlling the entrance and egress of said shutters to and from their open end closing position.

8. A solder wiping device for soldering machines, comprising in combination, means for supporting open end can bodies having soldered side seams, means located adjacent said supporting means for wiping the excess solder from said seams, conveyor means for propelling said can bodies along said support and past said seam wiping means, an endless conveyor located adjacent said support, a plurality of shutters carried on said endless conveyor for closing the open ends of said can bodies against the entrance of solder into their interiors while they are being conveyed past said seam wiping means, and means for pivoting said shutters on said endless conveyor to position a said shutter between adjacent can bodies and to move it into and from its open end closing position.

9. The combination of an outside horn, a solder wiping device, and a plate arranged within the horn near said wiping device so as to be interposed in the path of material thrown by said wiping device, and means for moving said interposed plate with a can traveling in said horn.

HAROLD F. SMITH.